United States Patent [19]

Randall et al.

[11] Patent Number: 5,667,057

[45] Date of Patent: Sep. 16, 1997

[54] DEVICE AND METHODS FOR MOVING AN OBJECT BETWEEN MACHINES JOINED BY A COMMON CONVEYOR

[75] Inventors: Frederick Randall, Montclair; Alfred J. Raven, III, Morganville, both of N.J.

[73] Assignee: Randall Manufacturing Co., Hillside, N.J.

[21] Appl. No.: 439,592

[22] Filed: May 1, 1995

[51] Int. Cl.$^6$ ............................................. B65G 25/00
[52] U.S. Cl. ......................................... 198/742; 198/468.1
[58] Field of Search ................................. 198/742, 468.1

[56]  References Cited

U.S. PATENT DOCUMENTS

| | | | |
|---|---|---|---|
| 2,808,746 | 10/1957 | Blomquist | 198/742 |
| 3,029,710 | 4/1962 | Fotsh et al. | 198/742 |
| 3,335,840 | 8/1967 | Beert et al. | 198/468.1 |
| 3,375,915 | 4/1968 | Fouse | 198/468.1 |
| 3,435,943 | 4/1969 | Johnson, Jr. | 198/742 |
| 3,613,331 | 10/1971 | Garrett | 198/742 |
| 4,089,203 | 5/1978 | Wallis | 198/742 |
| 4,469,214 | 9/1984 | Maurer et al. | 198/468.1 |

*Primary Examiner*—William E. Terrell
*Assistant Examiner*—Khoi H. Tran
*Attorney, Agent, or Firm*—Plevy & Associates

[57]  ABSTRACT

An automated assembly that can be retroactively added to a bank of machines in order to advance an object across the bank of machines in an automated fashion. The automation assembly includes a plurality of elongated elements that can be rotated from a first orientation, capable of engaging an object to be moved across the bank of machines, to a second orientation that is clear of the object to be moved. Each of the elongated elements are equidistantly spaced on a common support along a line matching the linear path along which the object on the bank of machines will be moved.

A reciprocating device joins the common support of the elongated elements to a stationary point. As a result, the reciprocating device causes the common support and the various elongated elements to reciprocate back and forth between a first position and a second position. As the reciprocating device moves from the first position to the second position, the elongated elements are in the first orientation wherein one of the elongated elements contacts the object and pushes it from the first position to the second position. When the reciprocating device returns the elongated elements back to the first position, the elongated elements first retract into the second orientation so as not to push the object backward from its newly advanced position. Once back at the first position, the elongated elements return to the first orientation, wherein a next subsequent elongated element engages the object and moves the object further along its linear path as the reciprocating device again moves the elongated element forward to the second position. This cycle is repeated until the object is advanced by each of elongated element present on the automation device.

14 Claims, 3 Drawing Sheets

DEVICE AND METHODS FOR MOVING AN OBJECT BETWEEN MACHINES JOINED BY A COMMON CONVEYOR

FIELD OF THE INVENTION

The present invention relates to a device, and an associated method, for linearly advancing an object along a roller conveyor from one machine to another. More particularly, the present invention relates to an automation assembly that can be retroactively added to a bank of machines, wherein the automation assembly controls the movement of object from one of the machines in the bank to another.

BACKGROUND OF THE INVENTION

Immersion cleaning devices are widely used in many different industries to clean and/or chemically treat a variety of manufactured products. For instance, immersion cleaning devices are widely used in machine shops to clean dirt, grease and other contaminants from used parts that are in need of repair. Furthermore, immersion cleaning devices are also commonly used to clean newly manufactured parts after a machining operation, wherein the machining operation contaminants the parts with residual machining oils, machine chips or other debris. An example of a typical immersion cleaning device can be found in U.S. Pat. No. 5,299,587 to Randall et al., entitled ROTATING AND RECIPROCATING IMMERSION CLEANING APPARATUS AND METHOD, assigned to Randall Manufacturing Company, the assignee herein.

Immersion cleaning devices operate by immersing contaminated parts into a cleaning solution. The contaminated parts and/or cleaning solution is then agitated to provide the needed cleaning action. The cleaning solution used within the immersion cleaning device is dependent upon what contaminant is to be removed from a particular object. Such solutions can be hydrocarbon based, however, due to environmental concerns, water-based solutions used in conjunction with detergents are typically used.

In a manufacturing environment, where it is desirable to clean a large number of parts at one time, parts are conventionally grouped into batches. A batch of parts is then entered into the immersion cleaning device where all the parts in the batch are cleaned simultaneously. Since immersion cleaning devices are used to clean a large variety of objects, such devices conventionally come equipped with wire mesh baskets or containers. These containers are sized to fit properly within the immersion cleaning device. The containers are filled with the batch of parts to be cleaned and is used to confine the movement of the parts during the cleaning procedure. The also allows multiple containers to be filled with batches of parts in advance, so that the containers can be quickly loaded and unloaded into the immersion cleaning device. Consequently, the amount of downtime experienced by the immersion cleaning device is reduced and more parts can be cleaned in a given period of time.

In many manufacturing applications, multiple immersion cleaning devices are placed in a line and are joined together with a common roller conveyor. In such a configuration, different machines in the line serve a different function. For example, in a bank of four machines, the first machine may soak a basket of parts in a solvent. The second machine may wash the basket of parts. The third machine may rinse the basket of parts and the fourth machine may be used to dry the basket of parts. In such a bank of machines, the basket of parts is typically manually moved from one machine to the other along the common conveyor that joins the various machines. This means that an operator must be standing near the bank of machines waiting for each machine to finish its cycle. The expense of such labor and the loss of time created by the operator's slow reaction time, significantly increased the overall cost of cleaning parts. Furthermore, operators are required to touch the basket of parts in order to move the basket from one machine to another. Often the baskets are wet with hazardous solvents or are too hot to be touched, causing a danger to the operator.

It is therefore an object of the present invention to provide an automated device capable of selectively moving a basket of parts along a conveyor from one machine to another.

It is another object of the present invention to provide a device that moves a basket of parts from one machine to another without having to have an operator touch the basket of parts.

It is yet another object of the present invention to provide an automated device that can be retroactively coupled to an existing bank of machines.

SUMMARY OF THE INVENTION

The present invention is an automated assembly that can be retroactively added to a bank of machines in order to advance an object across the bank of machines in an automated fashion. The automation assembly includes a plurality of elongated elements that can be rotated from a first orientation, capable of engaging an object to be moved across the bank of machines, to a second orientation that is clear of the object to be moved. Each of the elongated elements are equidistantly spaced on a common support along a line matching the linear path along which the object on the bank of machines will be moved.

A reciprocating device joins the common support of the elongated elements to a stationary point. As a result, the reciprocating device causes the common support and the various elongated elements to reciprocate back and forth between a first position and a second position. As the reciprocating device moves from the first position to the second position, the elongated elements are in the first orientation wherein one of the elongated elements contacts the object and pushes it from the first position to the second position. When the reciprocating device returns the elongated elements back to the first position, the elongated elements first retract into the second orientation so as not to push the object backward from its newly advanced position. Once back at the first position, the elongated elements return to the first orientation, wherein a next subsequent elongated element engages the object and moves the object further along its linear path as the reciprocating device again moves the elongated element forward to the second position. This cycle is repeated until the object is advanced by each of elongated element present on the automation device.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention automation assembly could be adapted to move objects on any roller conveyor system, the present invention was specifically designed to move objects between RAMCO® industrial cleaning machines such as the model MKD, MKT or MK machines currently manufactured and sold by RAMCO Equipment Corporation of Hillside, New Jersey. Accordingly, the present invention will be described in an application with RAMCO® industrial cleaning machines in order to set forth the best mode contemplated for the invention.

Figure 1:
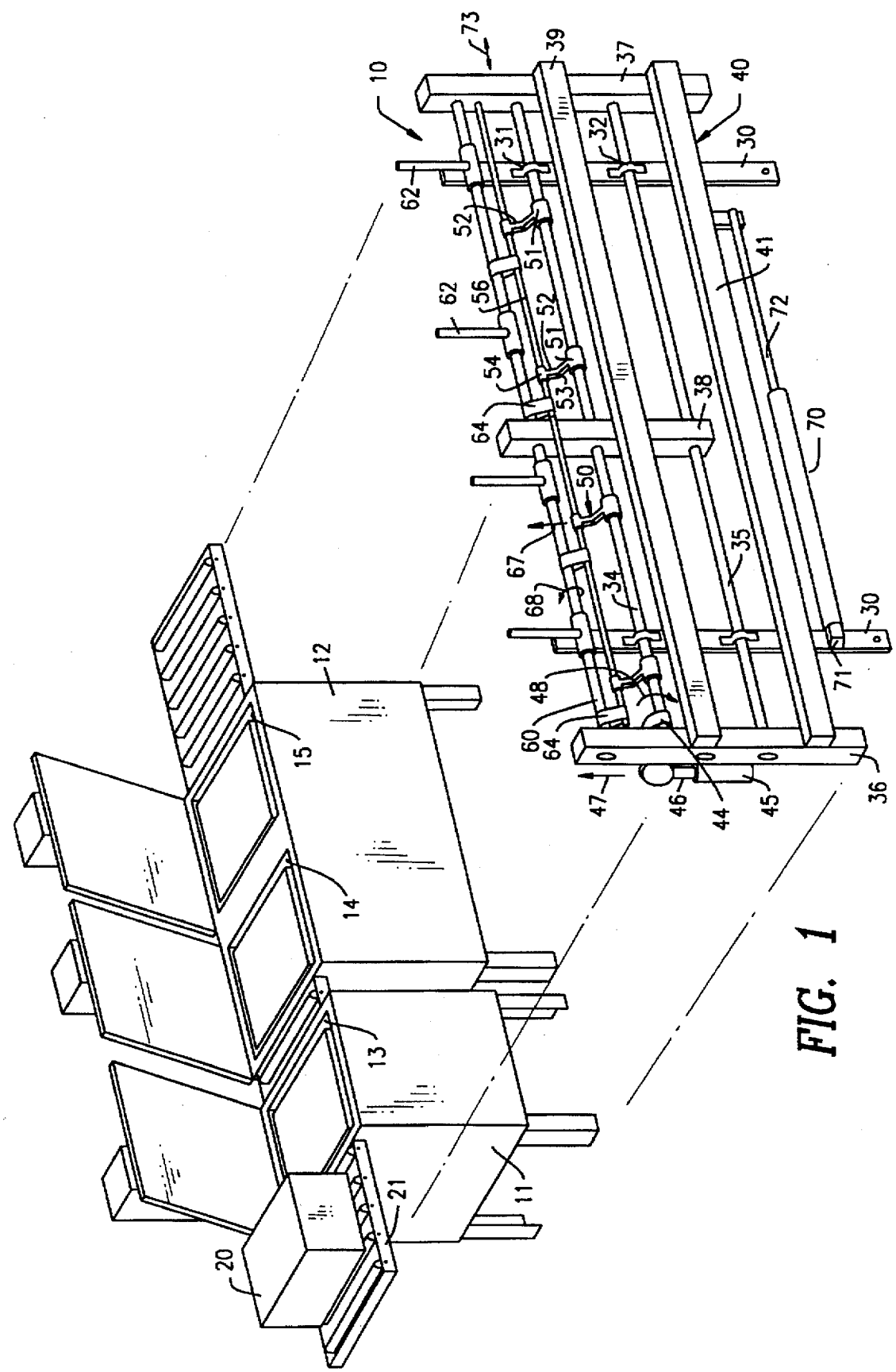
FIG. 1 is a perspective view of one preferred embodiment of the present invention automation device shown in an exploded fashion with a bank of industrial part washing machines to promote further consideration and discussion.

Referring to FIG. 1, there is shown a preferred embodiment of the present invention automation assembly 10 shown in conjunction with a bank of two RAMCO® industrial cleaning machines 11, 12. The first industrial cleaning machine 11 is a model MK machine whose operation is described in U.S. Pat. No. 5,299,587 to Randall et al., entitled ROTATING AND RECIPROCATING IMMERSION CLEANING APPARATUS AND METHOD. The model MK machine has a single processing chamber 13. The second industrial cleaning machine 12 is a model MKD machine which has two processing chambers 14, 15. The two industrial cleaning machines 11, 12 are aligned in a common bank, wherein each of the processing chambers 13, 14, 15 is dedicated to a specific purpose. For example, the first processing chamber 13 may be set up to wash a basket of parts 20. The second processing chamber 14 may be set up to rinse the basket of parts 20 and the third processing chamber 15 may be set up to dry the basket of parts 20. Each of the industrial cleaning machines 11, 12, 13 are aligned and form part of a common roller conveyor 21, upon which the basket of parts 20 rests.

It will be understood that the shown embodiment of two industrial cleaning machines with three processing chambers is merely exemplary and any number if machines with any number if processing chambers may be joined in the bank by the common roller conveyor 21.

The present invention automation assembly 10, attaches to the bank of industrial cleaning machines and acts to move at least one basket of parts 20 along the roller conveyor 21 between the various processing chambers that may be present. The automation assembly 10 includes two or more mounting brackets 30 that bolt to the forward surfaces of the bank of industrial cleaning machines. Each of the mounting brackets 30 support two slide bearings 31, 32, at two different vertical positions. Two rods 34, 35 pass through the slide bearings 31, 32. As a result, the two rods 34, 35 are free to move reciprocally though the bearings 31, 32 in the directions of the longitudinal axis of the rods. The rods 34, 35 terminate at both ends at a rigid support member 36, 37. Additionally, the rods 34, 35 may pass through at least one intermediate rigid support member 38 disposed in between the two end support members 36, 37. The two end support members 36, 37 and the intermediate support member 38 are joined by a series of rigid bars 39, 41 that create a rigid frame structure 40. Accordingly, as the two rods 34, 35 move back and forth through the slide bearings 31, 32, the entire rigid frame structure 40 also moves back and forth. As such, the entire rigid frame structure 40 is capable of moving laterally relative to the mounting brackets 30 and the bank of machines to which the mounting brackets 30 are attached.

Although the upper rod 34 and the lower rod 35 are confined by the rigid frame structure 40, each of the rods 34, 35 is mounted in a manner that allows each rod to rotate about its own longitudinal axis. The upper rod 34 has a torque arm 44 rigidly attached to it proximate one of the rigid support members 36. A pneumatic cylinder 45 that is rigidly attached to the support member 36, has an actuator arm 46 that engages the torque arm 44. As the pneumatic cylinder 45 extends its actuator arm 46 in the direction of arrow 47, the torque arm 44 pivots upwardly. This pivoting movement is transferred to the upper rod 34, thereby causing the upper rod 34 to rotate in the direction of arrow 48. A plurality of linkage assemblies 50 are affixed to upper rod 34. Each linkage assembly 50 includes a lever linkage 51 that is rigidly coupled to the upper rod 34 and a crank linkage 52 that is pivotably coupled to the lever linkage 51 at pivot point 53. Each of the crank linkages 52 terminate at a bearing block 54 at the end opposite the pivot point 53. A control rod 56 passes through each of the bearing blocks 54 in a manner that enables the control rod 56 to rotated within each of the bearing blocks 54.

An actuator rod 60 is supported by the various support members 36, 37, 38 at a position proximate the top of the frame structure 40. The actuator rod 60 is supported a manner that enables the actuator rod 60 to freely rotate around its own longitudinal axis. A plurality of elongated arms 62 are rigidly affixed to the actuator rod 60. As will later be explained, it is the elongated arms 62 that actually contact and move the basket of parts 20 on the roller conveyor 21. A plurality of torque arms 64 attach the actuator rod 60 to the control rod 56. Each torque arm 64 is rigidly affixed to both the actuator rod 60 and the control rod 56.

As the actuator arm 46 of the pneumatic cylinder 45 moves in the direction of arrow 47, the torque arm 44 pivots upwardly. The pivoting movement causes the upper rod 34 to rotate in the direction of arrow 48. As the upper rod 35 rotates, the lever linkage 51 in each of the linkage assemblies 50 also rotates in the direction of arrow 48. As the level linkages 51 move, they raise the crank linkage 52, which in turn push the control rod 56 upward in the direction of arrow 67. As the control rod 56 is raised upwardly, the torque arms 64 pivot and cause the actuator rod 60 to rotate in the direction of arrow 68. It is the rotation of actuator rod 60 that changes the orientation of the elongated arms 62. The movement of the pneumatic cylinder 45, the size of the torque arm 44, the size of the linkage assemblies 50 and the position of the control rod 56 are all calculated to create a predetermined change in the orientation of the elongated arms 62 from the shown vertical position 90° to a horizontal position. As a result, the elongated arms 62 can be selectively moved 90° between a horizontal position and a vertical position depending upon the activation or deactivation of the pneumatic cylinder 45.

A laterally oriented cylinder 70 is coupled at its base 71 to one of the mounting brackets 30 that attach to the bank of industrial cleaning machines. The actuator arm 72 of the cylinder 70 is coupled to the rigid frame structure 40. As a result, when the actuator arm 72 of the cylinder 70 moves back and forth, the entire frame structure 40 moves back and forth as the two reds 34, 35 pass through the slide bearings 31, 32. Since the mounting brackets 30 are coupled to the bath of industrial cleaning machines and the elongated arms 62 are supported by the frame structure 40, the actuation of the cylinder 70 acts to move the elongated arms 62 laterally along the length of the bank of machines in the directions of arrow 73.

Figure 2A:
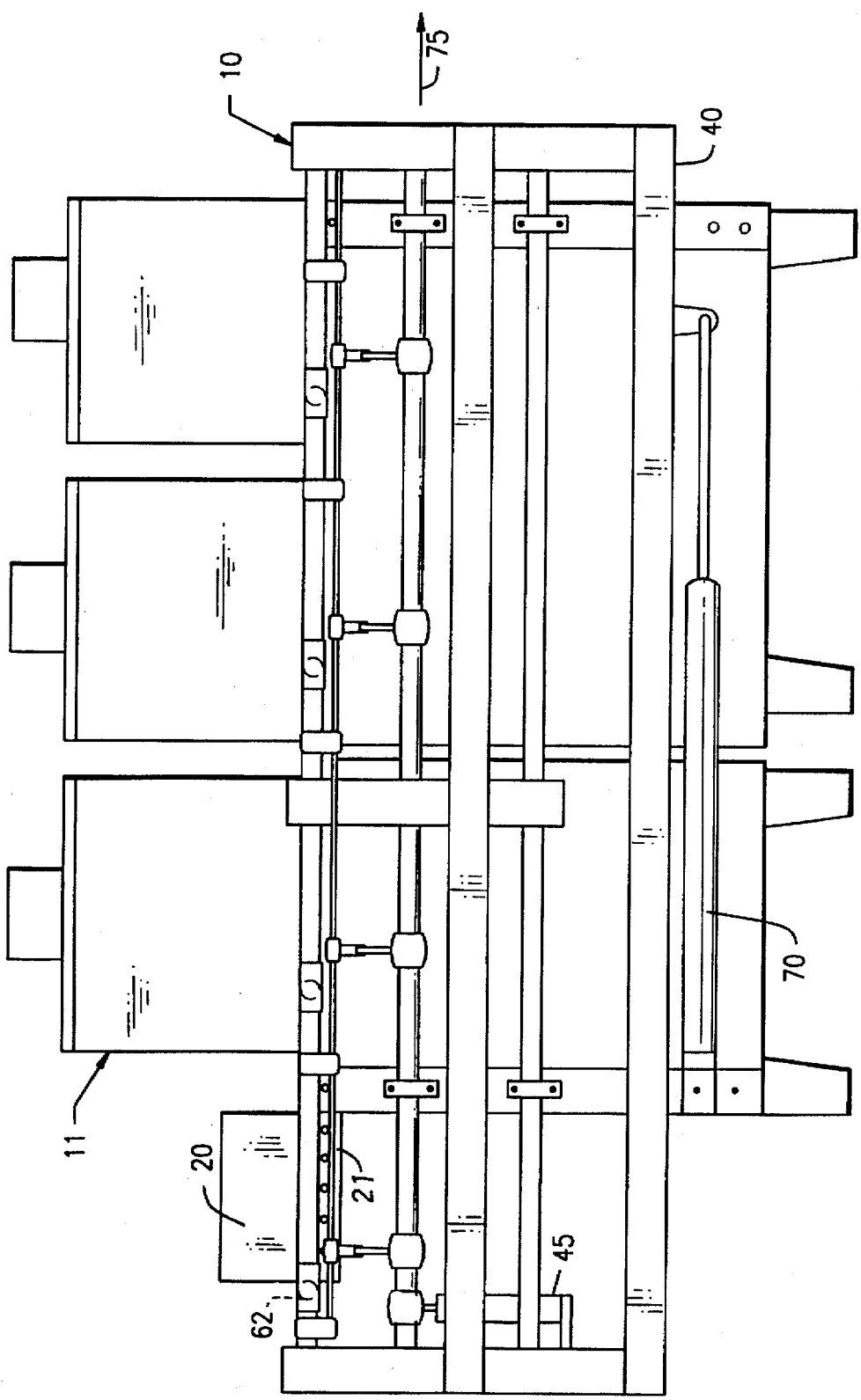
FIG. 2A is a front view of the present invention automation device mounted to a bank of industrial part washing machines, wherein the present invention is shown in a first condition of operation.

Referring to FIG. 2A, the operation of the present invention automated assembly 10 in conjunction with the bank of industrial cleaning machines can be explained. At the beginning of the operating cycle, the elongated arms 62 extending from the automated assembly 10 are in a vertical position (shown in hidden lines). At his point a basket of parts 20 is loaded onto the roller conveyor 21 in a loading zone next to the first machine 11. A pneumatic controller (not shown) is activated by an operator wherein the elongated arms 62 drop into a horizontal position next to the basket of parts 20 at a point just above the plane of the roller conveyor 21. The horizontal position of the elongated arms 62 requires that if the arms are moved in the direction of arrow 75, the first of the elongated arms 62 would engage the box of parts 20 on the side of the box of parts 20 opposite the direction in which the box of parts 20 is to be advanced. Each of the elongated arms 62 are spaced a predetermined distance D apart from one another. As will be later explained, the first of the elongated arms 62 pushes the box of parts 20 across the bank of machines for a distance at least as long as said predetermined distance D. As such, the first of the elongated arms 62 moves the box of parts 20 into the range of the second of the elongated arms 62. The second of the elongated arms 62 is then capable of engaging the box of parts 20 and moving the box into the range of a subsequent arm. This cycle is repeated until each of the elongated arms 62 has engaged the box of parts 20 and the box of parts 20 has been advanced across the entire length of the bank of machines.

Figure 2B:
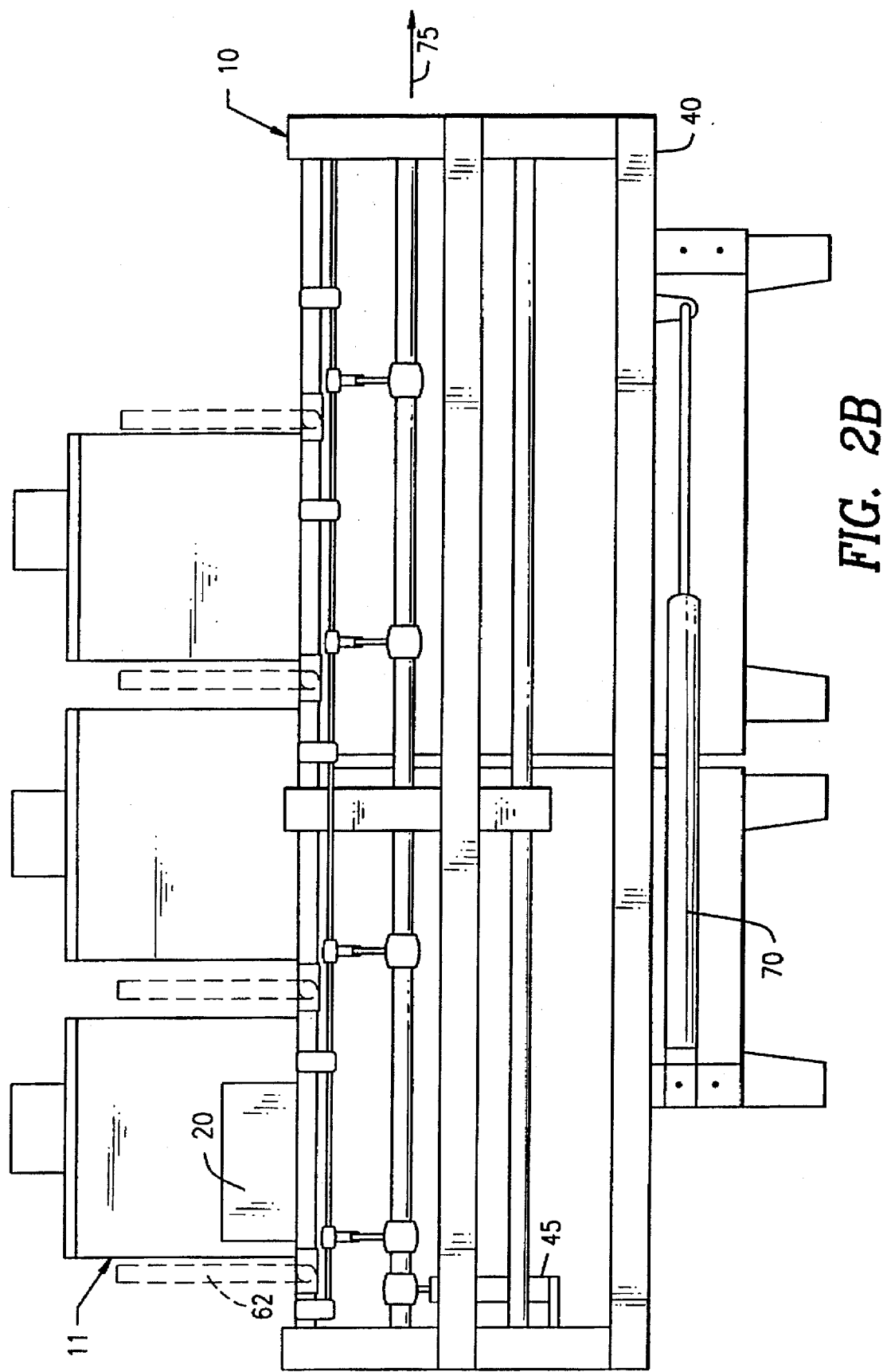
FIG. 2B is the same view as shown in FIG. 2A with the present invention now being shown in a second condition of operation.

Referring to FIG. 2B, it can be seen that actuation of the lateral cylinder 70 moves the entire frame structure 40 in the direction of arrow 75. As the frame structure 40 moves, so do the elongated arms 62 wherein the elongated arm 62 abuts against the side of the basket of parts 20 and moves the basket of parts 20 along the roller conveyor 21 in the direction of arrow 75. Once the basket of parts 20 is properly positioned over the first machine 11, the elongated arm 62 returns to its vertical orientation (shown in hidden lines), and the frame structure returns to its original orientation of FIG. 2A. As the cycle is repeated, the basket of parts 20 is propelled down the conveyor by each of the multiple elongated arms 62 until the basket of parts 20 has past through all of the machines in the bank and the basket is ready for unloading. Although only one box of parts is shown in FIGS. 2A and 2B, it should be understood that the present invention automation assembly I0 is capable of moving a plurality of boxes at once, wherein the plurality of boxes corresponds in number to the number of elongated arms 62 present on the assembly. Each of the elongated arms 62 is capable of moving a box of parts to a next subsequent position. Accordingly, each of the machines in the bank can be processing a box of parts simultaneously, wherein the multiple boxes of parts are moved in an automated and coordinated fashion between the machines.

Industrial part washers such as those illustrated contain pneumatic systems that are controlled by a pneumatic logic controller. The present invention automation device 10 operates by the selective control of only two pneumatic cylinders 45, 70, wherein the first cylinder 45 controls the up/down movement of the elongated arms 62 and the second cylinder 70 controls the lateral movement of the elongated arms 62 via the rigid frame structure 40. When the present invention automation device 10 is coupled to a bank of machines, the pneumatic elements of the automation device 10 are coupled to the pneumatic logic controller of the bank of machines. In this way, the operation of the automation device 10 is coordinated with the operation of the bank of machines. For instance, in the embodiment of FIGS. 2A and 2B, the automation device 10 would first move the basket of parts 21 onto the first machine 11 in the manner previously described. The elongated arms 62 would then raise to a vertical orientation and the automation device 10 would return to its starting position. The first machine 11 would then be activated to treat the basket of parts 20. Once the first machine 11 was complete with its treatment cycle, it would open and the elongated arms 62 would again fall to horizontal orientation. This time the second subsequent elongated arm would move the basket of parts of the second machine while the first elongated arm moved another basket of parts onto the first machine. This cycle is completed until all the baskets of parts to be treated have been moved through the entire bank of machines.

It will be understood that the embodiment of the present invention automation device described herein is merely exemplary and that many variations and modifications can be obtained using functionally equivalent components and alternate embodiments. All such variations and modification are intended to be included within the scope of the invention as defined in the appended claims.

What is claimed is:

1. A device for moving an object along linear path and adapted to be carried by a plurality of machines, comprising:

a pair of mounting brackets adapted to be carried by at least one of the machines;

an elongated rod slideably and rotatably carried by the mounting brackets;

a frame structure carried by said elongated rod;

an actuator rod rotatably carried by the frame;

a plurality of elongated elements extending from the actuator rod;

means for selectively rotating the actuator rod across a predetermined range, wherein the elongated elements move from a first orientation capable of engaging the object on the linear path to a second orientation clear of the object on the linear path; and lateral movement means for selectively moving the actuator rod and the frame on a parallel path a predetermined distance from a first position to a second position, whereby at least one of the elongated elements in the first orientation is capable of contacting the object at the first position and pushing the object from the first position to the second position.

2. A device according to claim 1, wherein the plurality of elongated elements are spaced apart by at least the predetermined distance, whereby an object moved from the first position to the second position by a first of the elongated elements can be engaged by a subsequent one of the elongated elements.

3. A device according to claim 1, wherein the lateral movement means includes a pneumatic cylinder coupled between one of the mounting brackets and the frame structure, wherein the pneumatic cylinder can be selectively controlled to move the frame structure between the first position and the second position.

4. A device according to claim 3, wherein the means for selectively rotating the actuator rod includes at least one linkage coupled to the actuator rod, and a second pneumatic cylinder coupled between the linkage and the frame structure, wherein the second pneumatic cylinder can be selectively controlled to move the linkage and apply a torque to the actuator rod, thereby selectively causing the movement of elongated elements between the first orientation and the second orientation.

5. A device according to claim 1, wherein the predetermined range is approximately 90°.

6. A device according to claim 3, wherein the means for selectively rotating the actuator rod includes:
- a leverage element coupled to the actuator rod wherein the leverage element pivots about the actuator rod;
- the elongated rod coupled to the frame structure in a manner that enables the elongated rod to rotate about its own longitudinal axis;
- at least one linkage coupled between the elongated rod and the leverage element;
- a torque arm rigidly coupled to the elongated rod; and
- a second pneumatic cylinder between the frame structure and the torque arm for selectively moving the torque arm and causing a corresponding rotation in the elongated rod, whereby the rotation causes the at least one linkage to move the leverage element and causes a corresponding rotation in the actuator rod.

7. A device as in claim 6, further comprising a pair of slide bearings mounted on the mounting brackets for slidably receiving the rod.

8. A device as in claim 6, wherein the leverage element is a control rod and a plurality of second torque arms are rigidly affixed to the actuator rod and the control rod.

9. A device for advancing each of a plurality of objects to each of a plurality of processing positions along a linear path defined by a plurality of conveyor segments, and adapted to be carried by a plurality of cleaning machines, comprising:
- a pair of mounting brackets adapted to be carried by at least one of the machines;
- an elongated rod and rotatably carried by the mounting brackets;
- a frame structure carried by said elongated rod;
- an actuator rod rotatably carried by the frame;
- a plurality of elongated elements extending from the actuator rod and corresponding in number to the plurality of processing positions wherein each of the plurality of elongated elements is spaced a predetermined distance apart;
- orientation means for selectively rotating the actuator rod across a predetermined range, wherein the elongated elements moving from a first orientation causes the plurality of elements to intersect the path of the plurality of objects and a second orientation clear of the plurality of objects on the linear path;
- lateral movement means for selectively moving said frame and plurality of elongated elements a predetermined distance along the linear path from a first position to a second position in a forward stroke and from the second position back to the first position in a return stroke, whereby at least one of the elongated elements in the first orientation is capable of contacting the object at the first position and pushing the object from the first position to the second position; and
- the orientation means and the lateral movement means adapted to couple to a controller of the plurality of cleaning machines.

10. A device according to claim 9, wherein the lateral movement means includes a pneumatic cylinder coupled between one of the mounting brackets and the frame structure, wherein the pneumatic cylinder can be selectively controlled to move the frame structure between the first position and the second position.

11. A device according to claim 10, wherein the orientation means includes:
- a control rod coupled to the actuator rod wherein the control rod pivots about the actuator rod;
- the elongated rod is coupled to the frame structure in a manner that enables the elongated rod to rotate about its own longitudinal axis;
- at least one linkage coupled between the elongated rod and the control rod;
- a torque arm rigidly coupled to the elongated rod; and
- a second pneumatic cylinder between the frame structure and the torque arm for selectively moving the torque arm and causing a corresponding rotation in the elongated rod, whereby the rotation causes the at least one linkage to move the control rod and cause a corresponding rotation in the actuator rod.

12. A device according to claim 11, wherein the pneumatic cylinder of the lateral movement means and second pneumatic cylinder of the orientation means are coupled to the controller of the plurality of the cleaning machines for coordinating the operation of the device with the plurality of the cleaning machines.

13. A method of advancing an object along a linear path to each of a plurality of processing positions, comprising the steps of:
- providing an automation assembly mounted on a plurality of cleaning machines, said assembly having a plurality of elongated arms on an actuator rod;
- positioning said plurality of elongated arms proximate to the linear path in a first orientation such that a first one of the plurality of elongated arms engages a side of the object opposite the direction in which the object is to be advanced, said actuator rod being supported on a frame mounted on a sliding and rotating elongated rod, in turn mounted on a pair of brackets adapted to be attached to said cleaning machines;
- moving the plurality of elongated arms a predetermined distance from a first position to a second position by moving a frame carrying the elongated arm relative to the plurality of cleaning machines, thereby pushing the object along the linear path from said first position;
- reorienting the plurality of elongated arms to a second orientation that is clear of the object on the linear path by pivotably rotating an actuator rod carrying the elongated arms;
- retracting the plurality of elongated arms from said second position back to said first position by moving the frame back to relative to the plurality of cleaning machines;
- orienting said plurality of elongated arms back into said first orientation by pivotably rotating the actuator rod, wherein a next subsequent one of said plurality of elongated arms engages the side of the object opposite the direction in which the object is to be advanced; and
- repeating the positioning, moving, reorienting, retracting, and orienting steps until the object has been pushed along the linear path to all of the processing positions.

14. A method according to claim 13, wherein the steps of moving and retracting the plurality of the elongated arms by moving the frame is done by a pneumatic cylinder, and the steps of positioning, reorienting, and orienting the plurality of elongated arms by pivotable rotation of the actuator rod is done by a second pneumatic cylinder, and further comprising the step of coordinating the operation of the automation assembly with the plurality of the cleaning machines by connecting the pneumatic cylinders to a controller of the plurality of the cleaning machines.

* * * * *